May 5, 1936. A. B. BOLENDER 2,039,579
HARDNESS TESTER
Filed Sept. 29, 1932
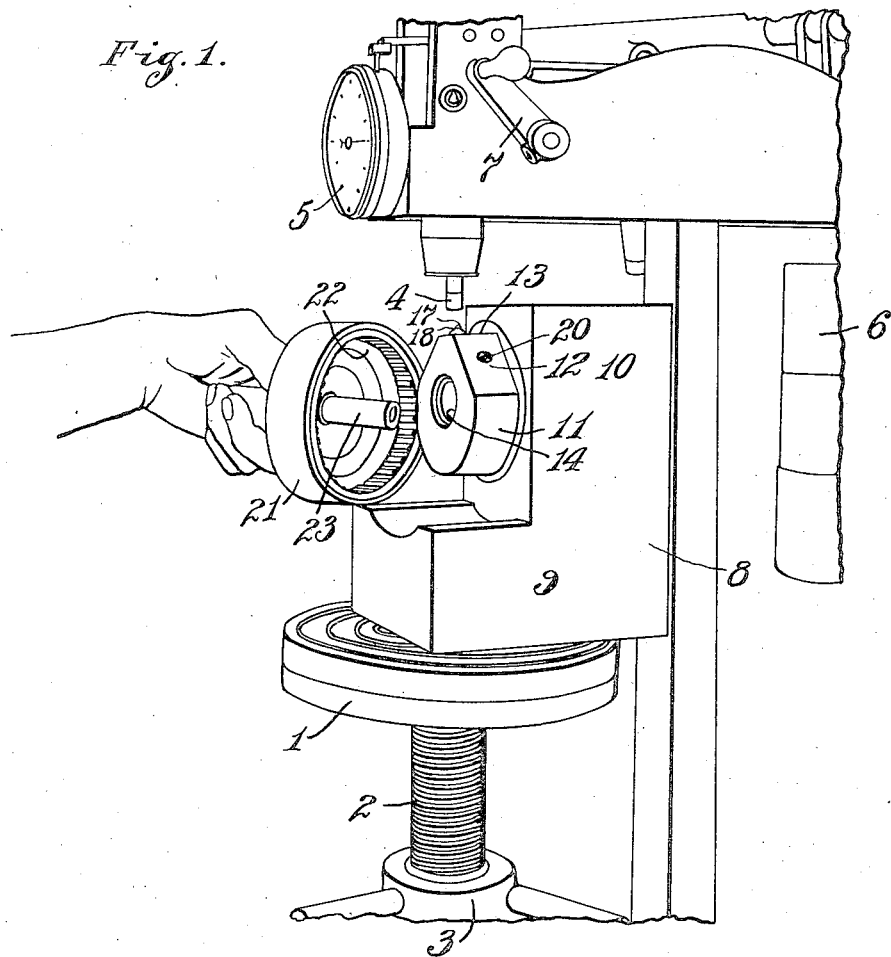
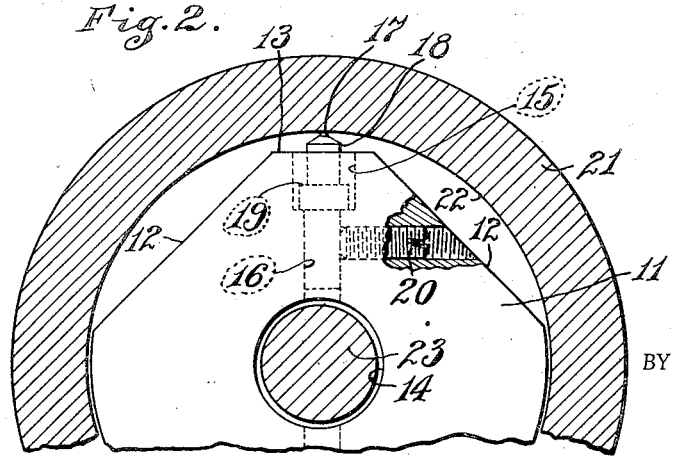
INVENTOR.
Augustus B. Bolender,
BY
Hood & Hahn.
ATTORNEYS

UNITED STATES PATENT OFFICE 2,039,579

HARDNESS TESTER

Augustus B. Bolender, Muncie, Ind., assignor, by mesne assignments, to Borg-Warner Corporation, Chicago, Ill., a corporation of Illinois Application September 29, 1932, Serial No. 635,313

1 Claim. (Cl. 265—12)

My invention relates to hardness testers particularly for testing metals and alloys.

One of the objects of my invention is to provide means whereby the hardness of the interior of a hollow article may be tested quickly, accurately, and readily and without in any way destroying the article itself.

In certain types of apparatus, such for instance as in certain types of overrunning clutches wherein one of the members consists of an annular ring having a surface on the interior thereof adapted to be engaged by a wedging member, it is extremely desirable that the hardness of this surface be tested on all of the structures to insure accuracy of operation of the clutch.

There are various other instances of this character as for instance internal gears. The above two instances are for the purpose of illustration and it is obvious that there are various characters of devices wherein it is desired to test the hardness of the interior of a hollow article.

For the purpose of disclosing my invention I have illustrated an embodiment thereof in the accompanying drawing in which:

Fig. 1 is a perspective view of a hardness tester embodying my invention; and

Fig. 2 is an end elevation showing the work partly in section of an anvil for use in connection with the hardness testing machine.

In the drawing I have illustrated my invention in connection with a Rockwell hardness tester. This machine is of a well known commercial type. The construction and operation of this tester is so well known in commercial arts that only a brief description thereof in the present instance is considered necessary. In general the tester comprises a testing table 1 mounted on a screw 2 preferably supported on a base and having its height adjusted by the operating nut 3. Overhanging this table is a weight-operated plunger 4 connected with an indicating dial 5 and operated by a weight 6. The influence of the weight 6 on the plunger 4 is controlled by an operating lever 7.

For the purpose of testing the interior surface of a hollow article I preferably associate with this machine an anvil member 8 having a base 9 adapted to rest on the testing table 1 and provided with a vertically extending portion 10 from the front face of which projects an anvil 11. The members 9, 10 and 11 cause the anvil 8 to take the form of a U resting on its side. This anvil may assume any desired shape and in the present instance is substantially round having its top portion chamfered off at 12 and its top flattened at 13. Preferably an opening 14 is provided in the center of the anvil. The top of the anvil has formed therein a hollow socket 15 having a reduced extension 16. This socket is adapted to receive a penetrator which preferably consists of a diamond 17 ground and polished accurately to a cone of a definite angle and mounted in a base or rod 18. The base member 18 is provided with a collar or shoulder 19 which rests on the shoulder formed in the socket 15 by the reduced portion 16 and the lower end of the base member projects into the opening 16 to be locked therein by a set screw 20 inserted from the side of the anvil.

In the operation of the machine, the piece 21, the hardness of the interior surface 22 of which is to be tested, is slipped over the anvil 11 with the surface 22 resting on the penetrator. It will be noted that the opening 14 accommodates a shaft or projection 23 which may be formed on or connected to a part of the piece. It will also be noted that the anvil 11 is vertically spaced sufficiently from the base portion 9 to accommodate various sized pieces. With the surface to be tested resting on the penetrator 17 the testing table is elevated to contact the piece with the plunger 4 and this elevation of the table is continued until the indicator 5 shows that "minor load" is applied to the piece. When this has been accomplished the handle or lever 7 is manipulated to cause the application of the "major load" to the plunger through the medium of the weight 6. This major load is a determined load and will cause a definite penetration of the penetrator 17 into the surface 22. When the pointer of the indicator 5 comes to rest the "Rockwell hardness" will be indicated on the indicator. The piece may then be removed and another piece inserted in position.

I claim as my invention:

The combination with a hardness testing machine including an adjustable abutment, a plunger cooperating with said abutment, means for applying a determinable "minor load" upon said plunger, means for applying a predetermined "major load" upon said plunger, and an indicator, of an anvil comprising a U-shaped member adapted to abut against said adjustable abutment, a penetrator mounted on one arm of said anvil, said arm having a recess extending thereinto substantially parallel with the axis of said arm to receive a portion of the article to be tested.

AUGUSTUS B. BOLENDER.